United States Patent [19]

Lee

[11] Patent Number: 5,423,214
[45] Date of Patent: * Jun. 13, 1995

[54] VARIABLE FLUID AND TILT LEVEL SENSING PROBE SYSTEM

[75] Inventor: Calvin S. Lee, 30492 N. Hampton Rd., Laguna Niguel, Calif. 92677

[73] Assignee: Calvin S. Lee, Laguna Niguel, Calif.

[*] Notice: The portion of the term of this patent subsequent to Aug. 18, 2009 has been disclaimed.

[21] Appl. No.: 222,169

[22] Filed: Apr. 4, 1994

Related U.S. Application Data

[63] Continuation of Ser. No. 11,728, Feb. 1, 1993, abandoned.

[51] Int. Cl.$^6$ .............................................. G01F 23/26
[52] U.S. Cl. .................. 73/304 C; 324/665; 324/669
[58] Field of Search .............. 73/304 C; 324/665, 662, 324/669, 671

[56] References Cited

U.S. PATENT DOCUMENTS

| | | | |
|---|---|---|---|
| 3,343,415 | 9/1967 | Johnston | 73/304 C |
| 3,534,606 | 10/1970 | Stamler et al. | 73/304 C |
| 3,620,080 | 11/1971 | Ryder | 73/304 C |
| 3,777,257 | 12/1973 | Geisselmann | 73/304 C |
| 3,827,300 | 8/1974 | Thaler | 73/304 C |
| 4,173,893 | 11/1979 | Hedrick | 73/304 C |
| 4,227,410 | 10/1980 | Ruben et al. | 73/301 |
| 4,235,106 | 11/1980 | Maltby et al. | 73/304 C |
| 4,258,422 | 3/1981 | Dougherty et al. | 73/304 C |
| 4,350,039 | 9/1982 | van Dyke et al. | 73/304 C |
| 4,417,473 | 11/1983 | Tward et al. | 73/304 C |
| 4,545,020 | 10/1985 | Brasfield | 73/304 C |
| 4,676,101 | 6/1987 | Baughman | 73/304 C |
| 4,780,705 | 10/1988 | Beane | 73/304 C |
| 4,800,542 | 1/1989 | Franklin et al. | 73/304 C |
| 4,841,227 | 6/1989 | Maier | 73/304 C |
| 4,908,783 | 3/1990 | Maier | 73/304 R |
| 4,935,727 | 6/1990 | Re Fiorentin et al. | 73/304 R |
| 5,138,880 | 8/1992 | Lee et al. | 73/304 C |
| 5,142,909 | 9/1992 | Baughman | 73/304 C |
| 5,182,947 | 2/1993 | Fidelak et al. | 73/304 C |

FOREIGN PATENT DOCUMENTS 0748138  7/1980  U.S.S.R. .......................... 73/304 C

Primary Examiner—Diego F. F. Gutierrez
Attorney, Agent, or Firm—Dinnin & Dunn

[57] ABSTRACT

Digital tilt level sensing probe system comprising a set of multiple capacitor elements in a fluid container arranged along an axis of measurement where each multiple capacitor element represents a discrete level increment in dielectric material fluid to be measured. Individual capacitors in each element are horizontally spaced to reflect a level differential upon tilting of the fluid container from its normal attitude. In the case of a probe for sensing tilting in a single plane, a one-piece body is employed to include integral capacitor elements, mounting pad, connector, custom IC pad, and circuitry molded into such body. Alternative references may be employed for comparison with each capacitor assigned a unique time slot in a switching sequence.

15 Claims, 2 Drawing Sheets

VARIABLE FLUID AND TILT LEVEL SENSING PROBE SYSTEM

This is a continuation of application Ser. No. 08/011,728, filed on Feb. 1, 1993, now abandoned.

BACKGROUND OF THE INVENTION

U.S. Pat. No. 5,138,880 discloses a digital level sensing probe system including digital probe constructed of two (2) concentric cylinders, forming a set of discrete, cylindrical capacitors that use the substance whose level is to be measured as a dielectric material. The set of capacitors is arranged along the axis of measurement where each capacitor represents a discrete level increment. Each capacitor is assigned a unique time slot in a switching sequence. The first level capacitor is used as a reference to which all other capacitors are sequentially compared. In the switching sequence, an AC signal is applied across each capacitor and compared with the inverted signal which is applied across the first level capacitor. A logic "1" results when the substance is present and a logic "0" when the substance is absent. The logic is decoded and converted to display the appropriate quantity of substance measured.

The possibility of mounting printed circuit configurations printed in the flat and mounted in facing relation on flat support elements with appropriate aligned spacing is mentioned in such Patent.

The use of individual isolated capacitors arranged along the axis of measurement, where each capacitor represents a discrete level increment checked sequentially in a unique time slot switching sequence for presence or absence of fluid, provides a marked advance in accuracy compared to analog probes which depend on variable dielectric values proportional to wetted level of the probe; also compared to semi-isolated capacitors employing a common electrode.

BRIEF DESCRIPTION OF THE PRESENT INVENTION

For further refinement of accuracy, it has been found desirable to compensate for tilting of the fluid container when the probe is offset from the geometrical center; also to accommodate situations where the first fluid level may have a different dielectric value from the higher level fluid which may impair its qualification as a reference, as in the case of condensation creating a water level under the principal gasoline, oil or other fluid to be measured. In order to accomodate the possibility of a different first level fluid, alternative references are disclosed herein which are not subject to first fluid level variations.

By separating discrete level capacitors into plural individual isolated capacitors in each plane of measurement with the container in normal attitude, the sensing of differential presence and absence of fluid at the individual capacitors of each level, may be employed as an indicator of tilting and programmed to compensate for fluid volume with such tilted attitude.

In the particular case of a vehicle on a road inclined upwardly or downwardly, a plurality of capacitors of a discrete level separated in the longitudinal plane of tilting will suffice for sensing the attitude of container. Such arrangement has been provided in the present embodiment which integrates the housing, mounting, connector, capacitive sensors and circuitry into a one-piece body where a custom integrated circuit may be applied onto the housing to form the entire fluid level sensing system in a flat configuration.

DETAILED DESCRIPTION OF PREFERRED EMBODIMENT

Figure 1:
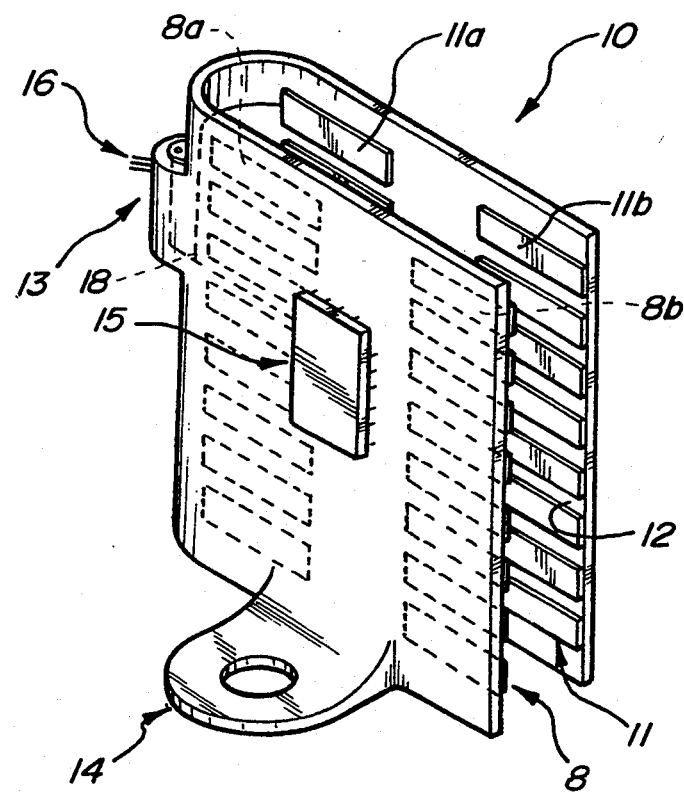
FIG. 1 is a perspective view of a one-piece body incorporating eight dual capacitor units, mounting pad connector and custom IC pad and circuitry molded into a flat body for sensing fore and aft tilting.

As shown in FIG. 1 in schematic form, fluid sensor of the present invention comprises one-piece body 10 having a set of discrete capacitor elements 11 formed as printed circuits bonded to facing surfaces 12 of body 10 integrally connected by connector 13 with mounting pad 14 and custom IC 15 mounted on exterior surface of body 10 which may be metalized to provide shielding. Three pins 16 are provided in connector 13 with printed circuit metalization, shown schematically as line 18, brought into the connector body up to the pin seating.

Figure 3:
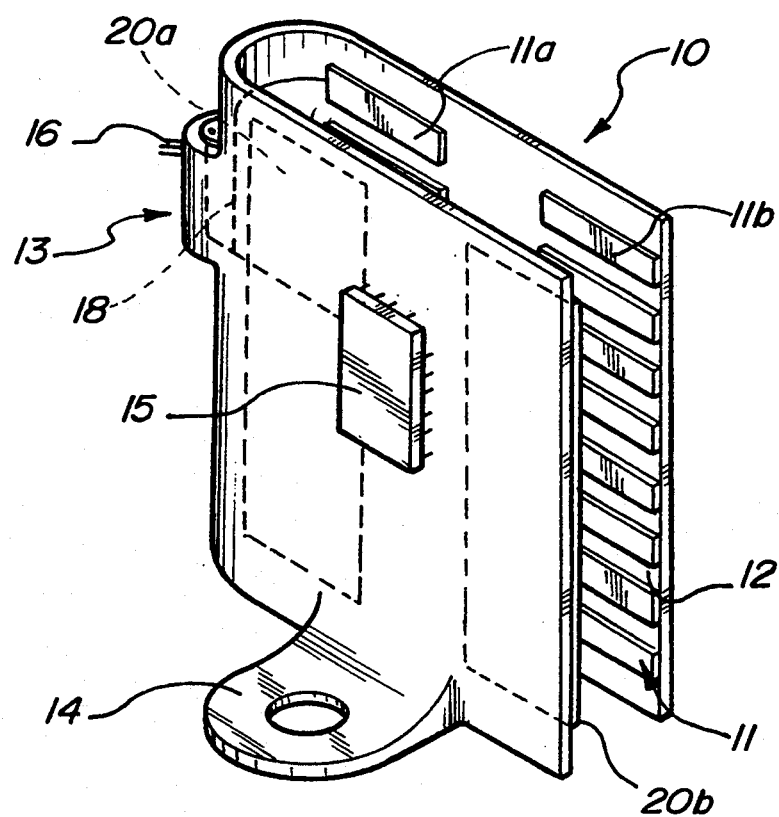
FIG. 3 is a first alternative embodiment of the sensing probe system of FIG. 1.

While greatest accuracy is obtained by providing completely isolated individual capacitors, partial benefits including the economy of a one-piece molded body may be realized where a common electrodes 20a, 20b, see FIG. 3, provided on one side face individual discrete capacitor elements at respective levels on the other side.

In order to detect attitude, the opposed capacitor elements 8, 11 can be separated into two columns 8a, 11a and 8b, 11b, forward and aft when the fluid sensor is mounted in the plane of tilting, and the inclination of the fluid calculated from the output of the opposed capacitor elements 8 and 11. If the container is tilted forward, i.e., rotated about an axis traverse the facing surfaces 12, the capacitor elements 8a, 11a and 8b, 11b will no longer be horizontally oriented, thus, the height of the fluid measured by the respective columns 11a and 11b of the capacitor elements will be different and will show the angle of inclination of tilting.

Figure 2:
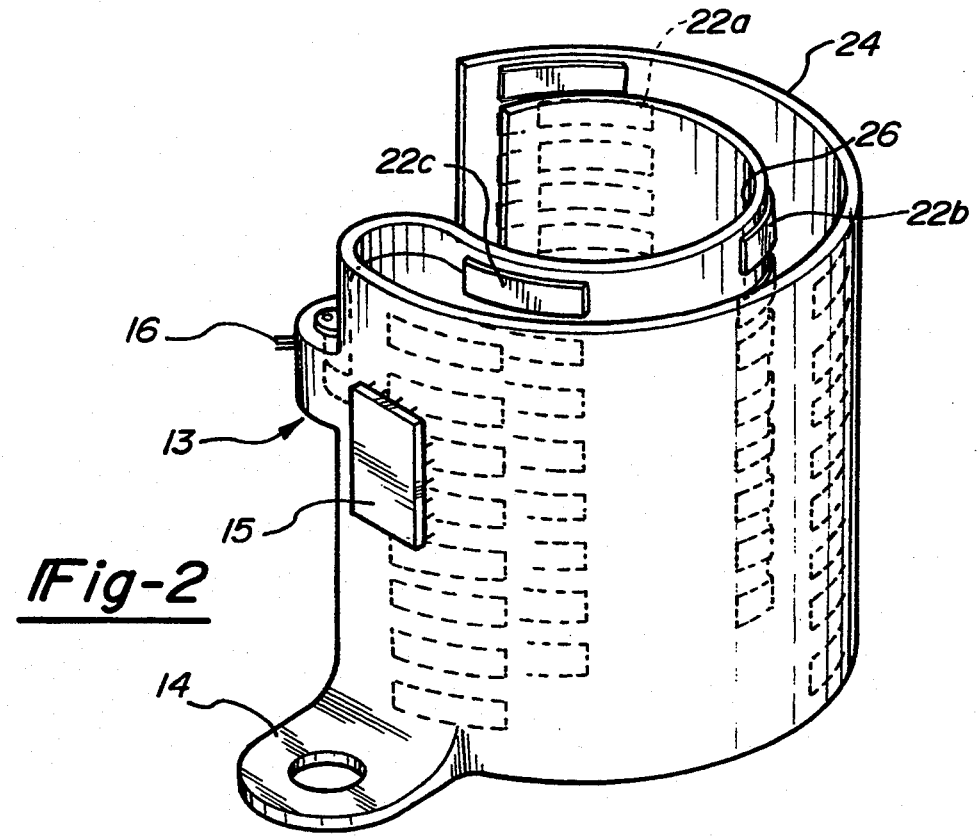
FIG. 2 is a perspective view of a one-piece body having a three circumferentially isolated capacitor elements arranged in columns for sensing tilting in any plane.

As shown in FIG. 2, in order to detect tilting in any plane, three or more circumferentially isolated capacitors 22 a, 22 b, 22 c may be provided at each measurement level in cylindrical housings such 24, 26 as disclosed in U.S. Pat. No. 5,138,880. By correlating volume increments of the particular container configuration to be monitored with tilting at the successive levels and storing the related data in relation to the container configuration, a more accurate compensated reading may be provided.

In providing a reference for each discrete capacitor, the first level capacitor may be employed to which all other capacitors are sequentially compared in a unique time slot as disclosed in the '880 patent. As mentioned above, in some cases, particularly where fluid other than the fluid to be measured is at the first level, as where condensed water settles below oil or gasoline to be measured, it may be better to use a reference other than the first level capacitor; for example, a fixed reference capacitor, physically different and not part of the probe body. In such case, the reference capacitor may be set at a value intermediate the respective capacitance of one of the elemental capacitors in the probe with or without liquid between its plates.

Alternatively, a microprocessor may be used to generate all the logic and multiplexing functions, in which case, a reference may be stored in the computer's memory which is proportional to the capacitance of the element. For example, if the element is in liquid the number might be twenty and when the element is empty, the number might be seventy. A threshold value of forty-five may be stored in memory and compared with each elemental number. If greater than forty-five, it is known to be air; if less than forty-five, liquid is indicated. In actual practice, for example, dielectric constants may be 1 for air and 2.1 for oil, which are assigned the numerical value of seventy for air and twenty for oil respectively. Therefore, forty-five gives a safety margin of plus or minus twenty-five counts between air and oil.

A fourth referencing method may use each capacitor as a reference for the following capacitor. Numerical thresholding can again be set at a midpoint.

With any of the referencing methods, the threshold value is reached when an individual capacitor is partially covered with the substance to be sensed. The same is true when the container is at its normal level or tilted to establish differential coverage of individual capacitors in a multi-capacitor element such as employed at successive levels to be sensed.

It will be understood that while two isolated capacitors may be employed to sense tilting in a single plane, or three 120° capacitors to sense tilting in any plane, it will be possible to subdivide the plural capacitor for each level into a higher number of individual isolated capacitors to achieve greater sensitivity in detecting the tilting angle, which with appropriate stored data related to the configuration of the container, can provide desired refinement of accuracy in measurement by the probe.

I claim:

1. Digital fluid level sensing probe for use in a fluid container comprising a set of capacitors arranged along an axis of measurement where each capacitor represents a discrete level increment in a horizontal plane of dielectric fluid to be measured, each capacitor comprising a pair of individual, electrically isolated capacitor elements, each individually subject to dielectric fluid which is present at its level and having sensible differential capacitance readable relative to a reference having an intermediate threshold value as to presence or absence of said fluid when addressed in a sequential individual tinge slot for each capacitor, plural individual capacitors at each level being spaced horizontally in columns to sense differentially fluid presence and absence upon tilting of the container from its normal attitude the arrangement of said plural individual capacitors providing memos to compensate for volumetric differentials incident to container tilting which is programmed relative to container configuration for enhanced accuracy of sensing volume indicated by fluid level.

2. Probe of claim 1 wherein said horizontal spacing is in a single plane subject to tilting differential of fluid presence at the individual capacitors of each level.

3. Probe of claim 2 wherein said probe comprises a one-piece body having two opposed sides joined by an integral connector, facing surfaces of each side having opposed adjacent capacitor elements spaced to accommodate intermediate dielectric fluid up to the fluid level in the container.

4. Probe of claim 3 including a custom integrated circuit pad applied to the outer surface of one of said sides.

5. Probe of claim 3 including an integral mounting pad for attachment of said one-piece body to the bottom surface of said container.

6. Probe of claim 3 wherein an outer surface of said one-piece body is metalized to provide shielding.

7. Probe of claim 1 including at least three of said plural individual capacitors at each level being spaced circumferentially to sense differentially fluid presence and absence upon tilting of the container in any direction.

8. Digital fluid level sensing probe for use in a fluid container comprising a set of capacitors arranged along an axis of measurement where each capacitor represents a discrete level increment in dielectric fluid to be measured, said capacitors being electrically isolated, each individually subject to dielectric fluid which is present at its level and having sensible differential capacitance readable relative to a reference having an intermediate threshold value as to presence or absence of said fluid when addressed in sequential individual time slots for each capacitor, said probe having a one-piece body, said body including opposed, spaced apart side portions and a connecting portion extending longitudinally in the axis of measurement continuously connecting said side portions, facing surfaces of said side portions having said capacitors secured thereon and said capacitors include opposed printed circuit capacitor elements spaced to accommodate intermediate dielectric fluid up to the fluid level in the container, said body having an integral mounting pad.

9. Probe of claim 8 including a custom integrated circuit pad applied to the outer surface of one of said side portions.

10. Probe of claim 8 wherein a surface, of said body is metalized to provide shielding.

11. Probe of claim 8 including terminals provided in said with circuitry being brought into said one-piece body up to the terminals in said connecting portion.

12. Probe of claim 8 wherein said set of capacitors further includes at least three capacitors at each level being spaced circumferentially to sense differentially fluid presence and absence upon tilting of the container in any direction.

13. Digital fluid level sensing probe for use in a fluid container comprising a set of capacitors arranged along an axis of measurement where each capacitor represents a discrete level increment in dielectric fluid to be measured, and having sensible differential capacitance readable relative to a reference having an intermediate threshold value as to presence or absence of said fluid when addressed in sequential individual time slots for each capacitor, said probe having a one-piece body, said body including opposed, spaced apart side portions and a connecting portion extending longitudinally in the axis of measurement continuously connecting said side portions, facing surfaces of said side portions having said capacitors secured to said facing surfaces and said capacitors include opposed printed circuit capacitor elements spaced to accommodate intermediate dielectric fluid up to the fluid level in the container, one side portion of said body having said capacitor elements formed as discrete isolated capacitor elements and a second side portion of said body having said capacitor elements formed as a common electrode, said body having an integral mounting pad.

14. Digital fluid level sensing probe for use in a fluid container comprising a set of capacitors arranged along an axis of measurement where each capacitor represents a discreet level increment in dielectric fluid to be measured, said capacitors being electrically isolated, each individually subject to dielectric fluid which is present at its level and having sensible differential capacitance readable relative to a reference having an intermediate threshold value as to presence or absence of said fluid when addressed in sequential individual time slots for each capacitor, said probe having a one-piece body, said body including opposed spaced apart side portions and a connecting portion extending longitudinally in the axis of measurement connecting said side portions, said side portions being arcuate and parallel, facing surfaces of said side portions having said capacitors secured thereon and said capacitors including opposed circuit capacitor elements spaced to accommodate intermediate dielectric fluid up to the fluid level in the container wherein said set of capacitors includes at least three individual capacitors at each level being spaced circumferentially to sense differential fluid presence and absence upon tilting of the container in any direction.

15. Digital fluid level sensing probe for use in a fluid container comprising a set of capacitors arranged along an axis of measurement where each capacitor represents a discrete level increment in dielectric fluid to be measured, said capacitors being electrically isolated, each individually subject to dielectric fluid which is present at its level and having sensible differential capacitance readable relative to a reference having an intermediate threshold value as to presence or absence of said fluid when addressed in sequential individual time slots for each capacitor, said probe having a one-piece body with two opposed sides jointed by an integral connector, facing surfaces of said sides having said capacitors secured thereon and said capacitors include opposed printed circuit capacitor elements spaced to accommodate intermediate dielectric fluid up to the fluid level in the container, said body having an integral mounting pad, and at least three capacitors of said set of capacitors at each level being spaced circumferentially to sense differentially fluid presence and absence upon tilting of the container in any direction.

* * * * *

UNITED STATES PATENT AND TRADEMARK OFFICE
CERTIFICATE OF CORRECTION

PATENT NO. : 5,423,214
DATED : June 13, 1995
INVENTOR(S) : Calvin S. Lee

It is certified that error appears in the above-indentified patent and that said Letters Patent is hereby corrected as shown below:

Column 2, line 50, after "housings", insert -- 24, 26 --; and delete "24, 26" after "such";

Column 3, line 52, Claim 1, "tinge" should be -- time --;
line 57, Claim 1, "memos" should be -- means --;

Column 4, line 42, Claim 11, after "said", insert -- connecting portion --.

Signed and Sealed this

Twentieth Day of February, 1996

Attest:

BRUCE LEHMAN

*Attesting Officer*      *Commissioner of Patents and Trademarks*